(12) United States Patent
Joshi et al.

(10) Patent No.: US 11,190,391 B1
(45) Date of Patent: Nov. 30, 2021

(54) NETWORK LOOP DETECTION IN HYBRID MESH NETWORKS

(71) Applicant: Amazon Technologies, Inc., Seattle, WA (US)

(72) Inventors: Avinash Joshi, San Jose, CA (US); Ashish Kumar Shukla, Milpitas, CA (US); Radhakrishnan Suryanarayanan, Fremont, CA (US); Sarang Shrikrishna Wagholikar, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 216 days.

(21) Appl. No.: 15/954,158

(22) Filed: Apr. 16, 2018

(51) Int. Cl.
*H04L 12/24* (2006.01)
*H04L 12/26* (2006.01)
*H04W 84/18* (2009.01)

(52) U.S. Cl.
CPC .......... *H04L 41/0654* (2013.01); *H04L 41/12* (2013.01); *H04L 43/0823* (2013.01); *H04W 84/18* (2013.01)

(58) Field of Classification Search
CPC . H04L 41/0654; H04L 41/12; H04L 43/0823; H04L 12/18; H04L 12/4633; H04L 41/0668; H04L 45/124
See application file for complete search history.

(56) References Cited

U.S. PATENT DOCUMENTS

| | | | | |
|---|---|---|---|---|
| 2009/0287804 | A1* | 11/2009 | Banks | H04L 67/147 709/223 |
| 2011/0119360 | A1* | 5/2011 | Kish | H04L 45/00 709/221 |
| 2015/0304983 | A1* | 10/2015 | Krening | H04B 17/318 370/254 |
| 2017/0250856 | A1* | 8/2017 | Jetcheva | H04L 45/124 |
| 2018/0212863 | A1* | 7/2018 | Akcan | H04W 40/246 |
| 2019/0227908 | A1* | 7/2019 | Munafo | G06F 11/0736 |
| 2020/0267641 | A1* | 8/2020 | Strong | H04W 48/20 |

OTHER PUBLICATIONS

Barekatain, B., et al., "Promoting Wired Links in Wireless Mesh Networks: An efficient Engineering Solution" PLOS One, DOI:10.1371/journal.pone.0119679, Mar. 20, 2015, 20 pages.
"Detect Cycle in an Undirected Graph", GeeksforGeeks, https://www.geeksforgeeks.org/detect-cycle-undirected-graph/, retrieved Mar. 2, 2018, 9 pages.

(Continued)

*Primary Examiner* — Rebecca E Song
(74) *Attorney, Agent, or Firm* — Lowenstein Sandler LLP

(57) ABSTRACT

Technology for network loop detection in a hybrid mesh network is described. In one embodiment, processing logic receives a network event message indicating a change in a network topology of a mesh network and, responsive to the network event message, determines that the mesh network includes at least one network loop comprising a plurality of communication links connecting two nodes of the mesh network. The processing logic further determines that the at least one network loop includes at least one wired communication link and disables at least one of the plurality of communication links to disconnect the at least one network loop.

18 Claims, 12 Drawing Sheets

(56) References Cited

OTHER PUBLICATIONS

Isabwe, G., et al., "A Novel Approach to WLAN Mesh Interworking with Multiple Mesh Portals", IEEE Xplore Conference Paper Nov. 2008, https://www.researchgate.net/publication/22434436, 7 pages.
"Tarjan's Strongly Connected Components Algorithm", Wikipedia, https://en/wikipedia.org/wiki/Tarjan%27s_strongly_connected_components_algorithm, last edited on Feb. 19, 2018, retrieved on Mar. 2, 2018, 4 pages.

\* cited by examiner

NETWORK LOOP DETECTION IN HYBRID MESH NETWORKS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technology for network loop detection in a mesh network is described herein. Nodes of a mesh network may establish peer-to-peer wireless links for sharing data. In an illustrative example, a mesh network may be employed for digital content distribution to client consumption devices in an environment of limited connectivity to broadband Internet infrastructure (e.g., for the delivery of media content to homes in dense urban areas). In one embodiment, the mesh network uses 802.11s based Wi-Fi mesh networking to provide connectivity for the distribution of content. The nodes of the mesh network may form a content distribution network (CDN) and client consumption devices connected to these nodes can receive content from the CDN.

In one embodiment, the mesh network functions primarily using wireless communication (e.g., Wi-Fi) links. Certain deployment scenarios, however, warrant the connecting of disjoint mesh clusters using wired communication links. Such a mesh network including both wireless communication links and wired communication links may be referred to herein as a "hybrid" mesh network. Conventional 802.11s based mesh networks use routing protocols to ensure that there are no datapath network loops when data flows through the mesh network. A different solution is used, however, to detect and manage loops when multiple disjoint mesh clusters are connected using wired communication links.

In one embodiment, a cloud-based Network Management System (NMS) can detect and manage loops in the hybrid mesh network to address the concerns of datapath loops when wired links are added to the mesh network. 802.11s based loop avoidance algorithms are ineffective when loops are formed due to wired links and the loop avoidance protocols tuned for wired networks pose additional burden on congested wireless networks. In one embodiment, NMS runs on a remotely connected cloud computing server and interacts with the nodes of the hybrid mesh network over cellular links to certain nodes in the cluster. In one embodiment, certain nodes include a cellular link to NMS, while other nodes lack such a cellular link. Those nodes without their own cellular link can connect to NMS through a peer-to-peer connection to one such node in the mesh network that has the cellular link. In one embodiment, NMS controlled network loop management performs loop detection based on network events, which are indications of changes in the mesh network topology. For example, these changes may include a connection or enabling of a new communication link between nodes of the mesh network or a disconnection or disabling of an existing communication link. The network event based detection is in contrast to dynamic loop detection and avoidance done by the Spanning Tree Protocol (STP), for example, which continuously sends special frames over the entire network utilizing bandwidth unnecessarily.

Figure 1:
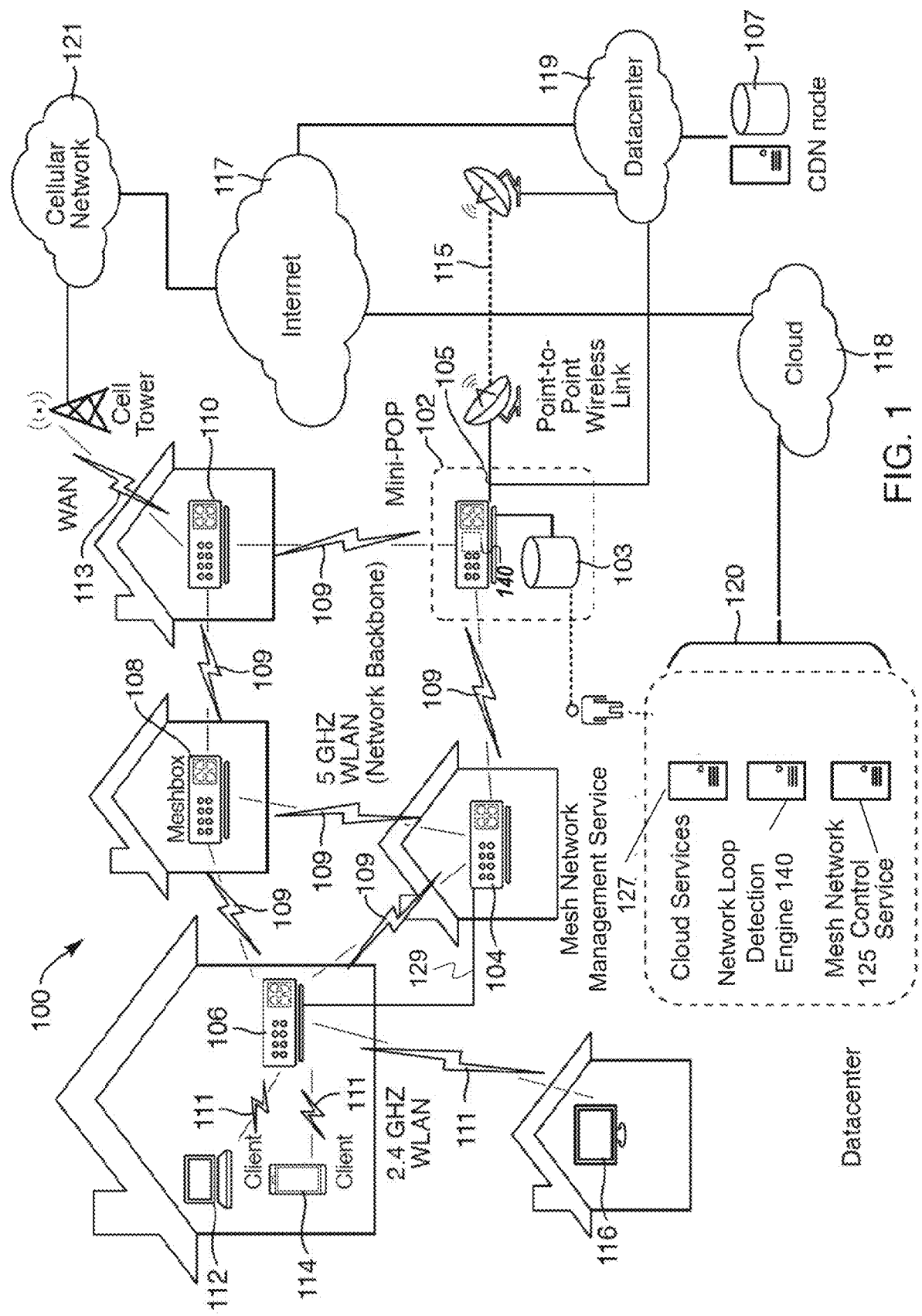
FIG. 1 is a network diagram of network hardware devices organized in a mesh network for content distribution to client devices in an environment of limited connectivity to broadband Internet infrastructure according to one embodiment.

FIG. 1 is a network diagram of network hardware devices 102, 104, 106, 108, and 110, organized in mesh network 100, for content distribution to client consumption devices in an environment of limited connectivity to broadband Internet infrastructure according to one embodiment. The mesh network 100 includes multiple network hardware devices 102, 104, 106, 108, and 110 that connect together to transfer digital content through the mesh network 100 to be delivered to one or more client consumption devices connected to the mesh network 100. In the depicted embodiment, the mesh network 100 includes a miniature point-of-presence (mini-POP) device 102 (also referred to as a mini-POP device), having a first wired connection to an attached storage device 103 and potentially at least one of a wired connection 105 or point-to-point wireless connection 115 to a content delivery network (CDN) device 107 (server of a CDN or a CDN node) of an Internet Service Provider (ISP), or both. The CDN device 107 may be a POP device, an edge server, a content server device, or another device of the CDN. The mini-POP device 102 may be similar to POP devices of a CDN in operation. However, the mini-POP device 102 is called "miniature" to differentiate it from a POP device of a CDN given the nature of the mini-POP device 102 being a single ingress point to the mesh network 100; whereas, the POP device of a CDN may be one of many in the CDN.

The point-to-point wireless connection 115 may be established over a point-to-point wireless link 115 between the mini-POP device 102 and the CDN device 107. Alternatively, the point-to-point wireless connection 115 may be established over a directional microwave link between the mini-POP device 102 and the CDN device 107. In other embodiments, the mini-POP device 102 is a single ingress node of the mesh network 100 for the content files stored in the mesh network 100. Thus, the mini-POP 102 may be the only node in the mesh network 100 having access to the attached storage and/or a communication channel to retrieve content files stored outside of the mesh network 100. In other embodiments, multiple mini-POP devices may be deployed in the mesh network 100, but the number of mini-POP devices may be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. All of the network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless connection 115. The point-to-point wireless connection 115 can be considered a broadband connection for the mesh network 100. In some cases, the mini-POP device 102 does not have an Internet connection via the point-to-point wireless connection 115 and the content is stored only in the attached storage device 103 for a self-contained mesh network 100. In such cases, the content in the attached storage can be manually refreshed from time to time.

The mesh network 100 also includes multiple mesh nodes 104, 106, 108, and 110 (also referred to herein as meshbox nodes and network hardware devices). The mesh nodes 104, 106, 108, and 110 may establish multiple P2P wireless connections 109 between mesh nodes 104, 106, 108, and 110 to form a network backbone. It should be noted that only some of the possible P2P wireless connections 109 are shown between the mesh nodes 104, 106, 108, and 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection 109. In addition, one or more of the mesh nodes 104, 106, 108, and 110 may be connected via a wired communication link. In particular, the first mesh node 104 is coupled to the second mesh node 106 via a wired communication link 129. Since mesh network 100 includes both wireless communication links 109 and at least one wired communication link 129, the mesh network 100 may be referred to herein as a "hybrid" mesh network. The mesh nodes 104, 106, 108, and 110 (and the mini-POP device 102) may be MRMC mesh network devices. As described herein, the mesh nodes 104, 106, 108, and 110 do not necessarily have reliable access to the CDN device 107. The mesh nodes 104, 106, 108, and 110 (and the mini-POP device 102) wirelessly communicate with other nodes via the network backbone via a first set of WLAN channels reserved for inter-node communications. The mesh nodes 102, 104, 106, 108, and 110 communicate data with one another via the first set of WLAN channels at a first frequency of approximately 5 GHz (e.g., 5 GHz band of the Wi-Fi® network technologies).

Each of the mesh nodes 104, 106, 108, and 110 (and the mini-POP device 102) also includes multiple node-to-client consumption devices (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 via a first N2C wireless connection 111, a second client consumption device 114 via a second N2C wireless connection 111, and a third client consumption device 116 via a third N2C wireless connection 111. Client consumption devices can include TVs, mobile phones, streaming media players, PCs, Tablets, game consoles, and the like. The second node 106 wirelessly communicates with the client consumption devices via the second set of WLAN channels at a second frequency of approximately 2.4 GHz (e.g., 2.4 GHz band of the Wi-Fi® network technologies).

One or more of the mesh nodes 104, 106, 108, and 110 (and the mini-POP device 102) also includes a cellular connection 113 to wirelessly communicate control data between the respective node and a cloud device 118 hosting a mesh network control service 125 described below. The cellular connection 113 may be a low bandwidth, high availability connection to the Internet 117 provided by a cellular network 121. The cellular connection 113 may have a lower bandwidth than the point-to-point wireless connection 115. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The cloud device 118 may be one of a collection of devices organized as a cloud computing system that that hosts one or more services 120. Although cellular connection 113 may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like).

The services 120 may include a mesh network control service 125 and a mesh network management service (or system) 127. The services 120 may also include cloud services to control setup of and manage the mesh nodes, a network loop detection engine 140, as well as other cloud services. In one embodiment, network loop detection engine 140 is a subcomponent of the larger mesh network management service 127 which provides other functionality in addition to loop detection. The mesh network control service 125 can be one or more cloud services. These cloud services can include a metric collector service, a health and status service, a link selection service, a channel selection service, a content request aggregation service, or the like. There may be APIs for each of these services. In one embodiment, network loop detection engine 140 performs network loop detection in the hybrid mesh network. In one embodiment, network loop detection engine 140 receives network event messages from one or more of mesh nodes 104, 106, 108, and 110 (or the mini-POP device 102) indicating a change in a network topology the mesh network 100. For example, the changes may include a connection or enabling of a new communication link between nodes of the mesh network 100 or a disconnection or disabling of an existing communication link. In one embodiment, the network event message may be received via cellular connection 113. Responsive to the network event message, network loop detection engine 140 determines whether the mesh network 100 includes any wired communication links. If so, network loop detection engine 140 determines whether the mesh network 100 includes at least one network loop comprising a plurality of communication links connecting two nodes of the mesh network 100. If there is a network loop, and the loop includes at least one wired communication link, such as wired communication link 129, network loop detection engine 140 disables at least one of the plurality of communication links in the loop to disconnect the network loop. In one embodiment, network loop detection engine 140 can be deployed in a centralized configuration in which the network loop detection engine 140 is deployed as a centralized controller, such as part of mesh network management service 127 or one of other services 120. Alternatively, in another embodiment, network loop detection engine 140 can run directly on mini-POP device 102 in mesh network 100. Additional details regarding the loop detection operations of network loop detection engine 140 are provided below with respect to FIGS. 3-7.

Although only four mesh nodes 104, 106, 108, and 110 are illustrated in FIG. 1, the mesh network 100 can use many mesh nodes, wirelessly connected together in a mesh network, to move content through the mesh network 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running client software (i.e., a media client). In one embodiment, the client software may be an application or other program designed to enable access to the CDN catalog and provide for playback video titles or other media items selected therefrom, in response to a request from a user. The 2.4 GHz WLAN channels are reserved for serving client consumption devices. The 2.4 GHz band may be chosen for serving media clients because there is a wider device adoption and support for this band. Additionally, the bandwidth requirements for serving client consumption devices will be lower than that of the network backbone. The number of media clients that each Meshbox node can support depends on a number of factors including memory, bandwidth requirements of the media client, incoming bandwidth that the Meshbox node can support, and the like. For example, the Meshbox nodes provide coverage to users who subscribe to the content delivery service and consume that service through the client consumption devices (e.g., a mobile phone, a set top box, a tablet, or the like). It should be noted that there is a 1-to-many relationship between Meshbox nodes and households (not just between nodes and media clients). This means the service can be provided without necessarily requiring a user to have a Meshbox node located in their house, as illustrated in FIG. 1. As illustrated, the second mesh node 106 services two client consumption devices 112, 114 located in a first house, as well as a third client consumption device 116 (e.g., a TV client) located in a second house. The Meshbox nodes can be located in various structures, and there can be multiple Meshbox nodes in a single structure.

The mesh network 100 may be used to address two main challenges: moving high bandwidth content to users and storing that content in the limited available storage of the mesh network itself. The first challenge may be addressed in hardware through the radio links between mesh nodes and the radio links between mesh nodes and client consumption devices, and in software by the routing protocols used to decide where to push traffic and link and channel management used to configure the mesh network 100. The second challenge may be addressed by borrowing from the existing content distribution strategy employed by the content delivery services using caches of content close to the user. The architecture to support content caching is known as a CDN. An example CDN implementation is the AWS CloudFront service. The AWS CloudFront service may include several point-of-presence (POP) racks that are co-located in datacenters that see a lot of user traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 may not have a wired or wireless network connection to the next level of cache (i.e., in CDN node 107). In another embodiment, the mini-POP device 102 may have a network connection (e.g., via the Internet) to the next level of cache, but this connection may not be a high-speed backhaul such as that used in a traditional data center. The following describes two different solutions for providing access to the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections of the mesh network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The mesh network 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 115 or the HITL process at the mini-POP device 102. Availability and impact on cost in terms of storage may be relevant factors in determining which content is to be injected into the mesh network 100 and which content is to remain in the mesh network 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the mesh network 100 described herein can provide distribution of content that is high bandwidth, but in a manner that does not need low latency. Thus, popular content can reside closer to the client consumption devices of the mesh network 100 and reduce the latency normally associated with retrieving that content from the CDN.

In some embodiments, prior to consumption by a node having a media client itself or being wirelessly connected to a media client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the mesh network 100. The mesh network 100 can provide some fault tolerance so that a single mesh node becoming unavailable for failure or reboot has minimal impact on availability of content to other users. This means that a single mesh node is not the sole provider of a piece of content. The mesh network 100 can use reliability and availability mechanisms and techniques to determine where and how to store content in the mesh network 100.

The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, DRM, and node authentication.

Figure 2:
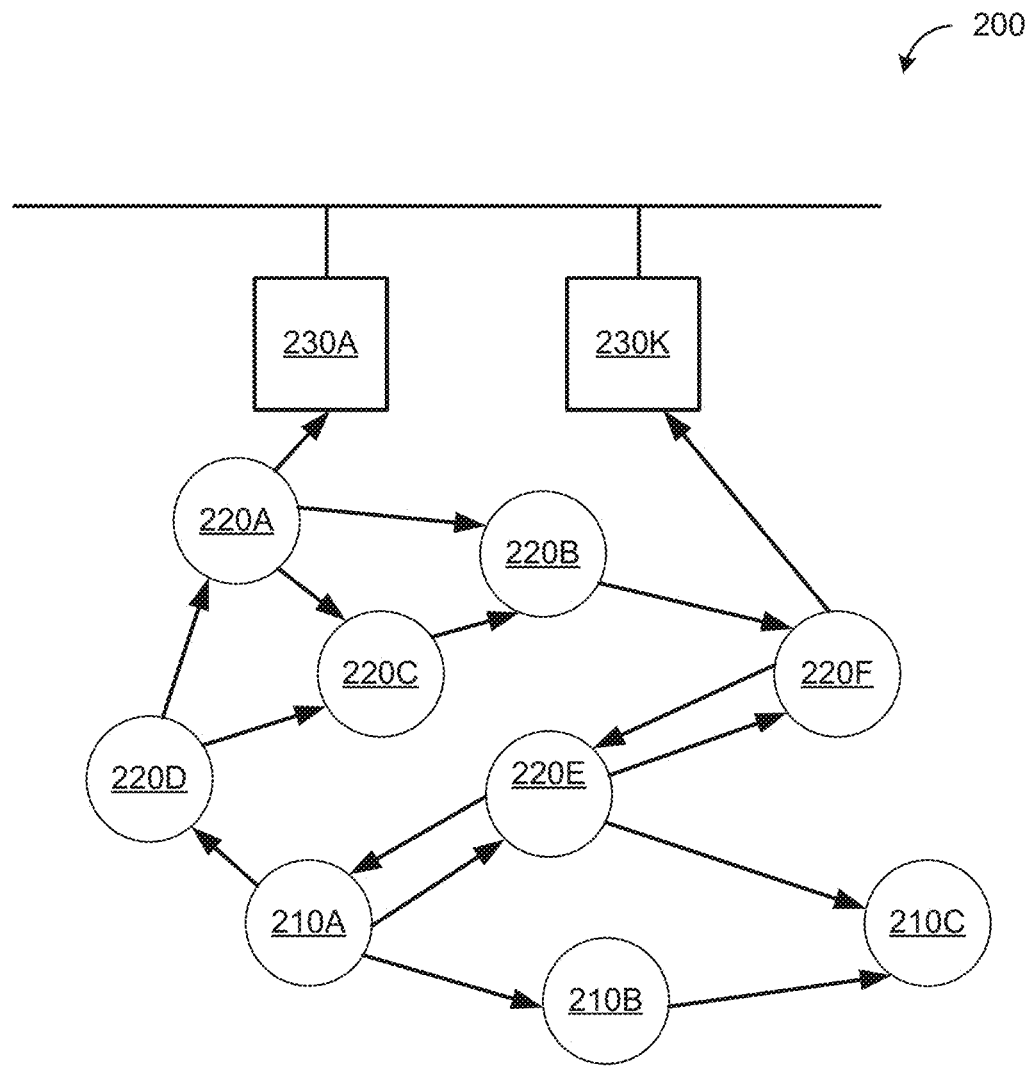
FIG. 2 is a functional network diagram of an illustrative example of a mesh network operating in accordance with embodiments of the present disclosure.

FIG. 2 is a functional network diagram of an illustrative example of a mesh network operating in accordance with embodiments of the present disclosure. In one embodiment, each of the network devices of mesh network 100 of FIG. 1 may implement functions of one or more functional components of FIG. 2. In other embodiments, various other mesh networks may include hardware and/or software components which may implement functions of one or more functional components of FIG. 2.

As schematically illustrated by FIG. 2, an example mesh network 200 may include a plurality of mesh network nodes including communication devices that implement the functions of wireless mesh point stations (MP STA) 210A-210C, mesh access points (MAP) 220A-220F, and mesh portals (MPP) 230A-230K. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a mesh network operating in accordance the embodiments of the present disclosure (e.g., mesh network 100 of FIG. 1). Discovering available mesh networks may be performed by passive or active scanning. In the passive scanning mode, the network device records the information from any beacon frames that have been received on one or more radio channels. Beacon frames are periodically transmitted by wireless access points in order to allow network devices to detect and identify the mesh network, as well as match communication parameters for determining whether to join the mesh network. In the active scanning mode, the network device may transmit, on each of one or more radio channels supported by the network device, probe request frames in order to solicit responses from available networks. An access point receiving a probe request may generate a probe response advertising the network parameters.

Figure 3:
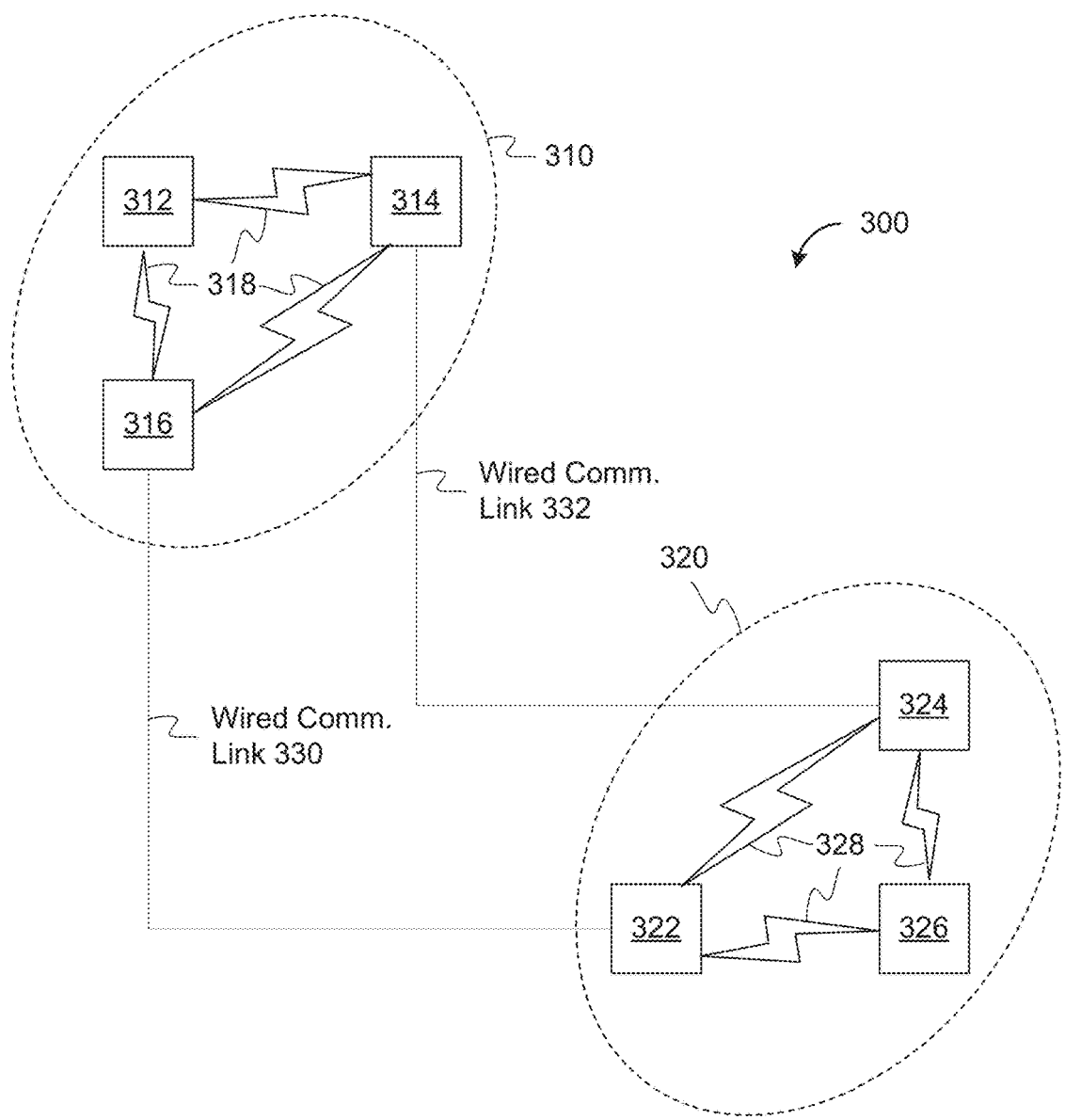
FIG. 3 is a block diagram illustrating disjoint wireless mesh clusters of nodes interconnected by a wired communication link, according to an embodiment.

FIG. 3 is a block diagram illustrating disjoint wireless mesh clusters of nodes interconnected by a wired communication link, according to an embodiment. In certain embodiments, mesh networks are targeted for deployment in densely populated urban areas, which may typically consist of closely located buildings. A mesh cluster includes a set of nodes (e.g., access points) that form a Wi-Fi mesh network among themselves. Typically, a single mini-POP device serves as the content source in each mesh cluster. Ideally, a single mesh cluster would be made up of nodes installed across several buildings.

In certain deployment situations, however, it may not be possible to form a single contiguous mesh cluster (i.e., where there is contiguous wireless connectivity among the nodes in the cluster via wireless communication links. There are a number of possible scenarios that can result in disjoint mesh clusters, where some clusters do not contain a mini-POP device to fetch content from the CDN. For example, there may be discontinuity within a building. Disjoint mesh clusters can form if several contiguous floors in the building do not have any mesh network nodes due to a lack of customers on those floors. In addition, there may be discontinuity within a single floor of a building. This discontinuity can occur if multiple apartments on the same floor do not have any mesh network nodes due to a lack of customers in those apartments. Furthermore, there may be discontinuity across multiple buildings. This can occur when there are multiple buildings with their own well-formed mesh clusters, but a mini-POP device is present in only one of them (or at least not present in one of them).

FIG. 3 illustrates two disjoint wireless mesh clusters 310 and 320 of nodes. Cluster 310 includes nodes 312 and 314, as well as mini-POP device 316. Nodes 312 and 314 and mini-POP device 316 are interconnected by wireless communication links 318. Cluster 320 includes nodes 322, 324, and 326, but does not include a separate mini-POP device. Nodes 322, 324, and 326 are interconnected by wireless communication links 328. In one embodiment, nodes 312 and 314 and mini-POP device 316 are located in a first geographical area and are all within a first threshold distance of each other. Nodes 322, 324, and 326 may be located in a second geographical area and be within a second threshold distance of each other. In one embodiment, both the first and second threshold distances are short enough to enable wireless communication by wireless communication links 318 or 328. In one embodiment, the distance between clusters 310 and 320 may be greater than either the first threshold distance or the second threshold distance and may be too great to permit wireless communication. In one embodiment, the discontinuity between clusters 310 and 320 is remedied by the use of wired communication links 330 and 332. Wired communication links 330 and 332 may each include, for example, a single direct Ethernet connection, multiple redundant Ethernet links, or some other wired network connection. As shown in FIG. 3, wired communication link 330 is connected between mini-POP device 316 in cluster 310 and node 322 in cluster 320 and wired communication link 332 is connected between mini-node 314 in cluster 310 and node 324 in cluster 320. In other embodiments, the wired communication links 330 and 332 may be connected between any device in cluster 310 and any device in cluster 320. Wired communication links 330 and 332 may serve to connect disjoint wireless mesh clusters 310 and 320 to form a single hybrid mesh network 300 including both wired and wireless communication links. As described above, the network loop detection engine 140 shown in FIG. 1 can perform network loop detection in the hybrid mesh network 300 to identify and remedy any network loops that may be present.

Figure 4A:
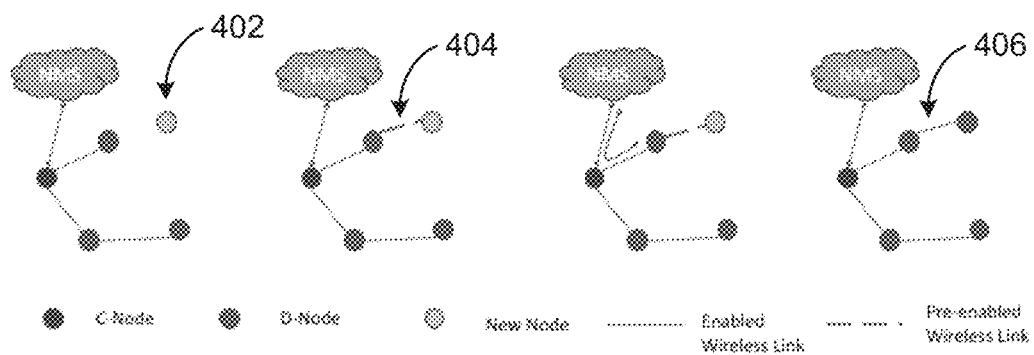
FIGS. 4A-4C illustrate various processes of adding pre-enabled communication links to a mesh network, according to an embodiment.
Figure 4B:
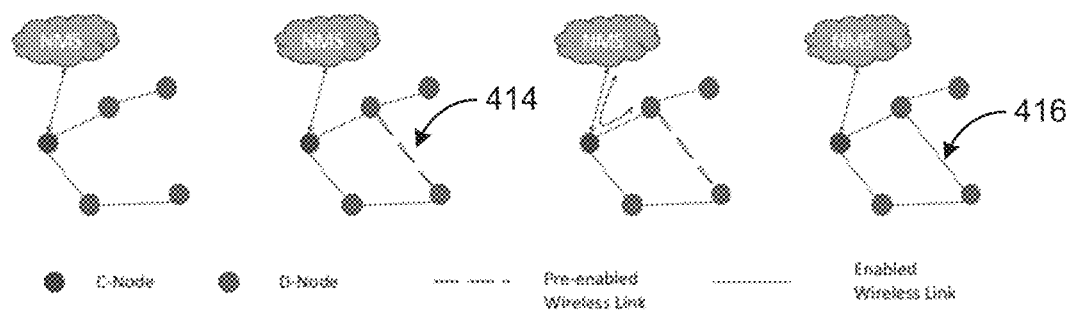
Figure 4C:
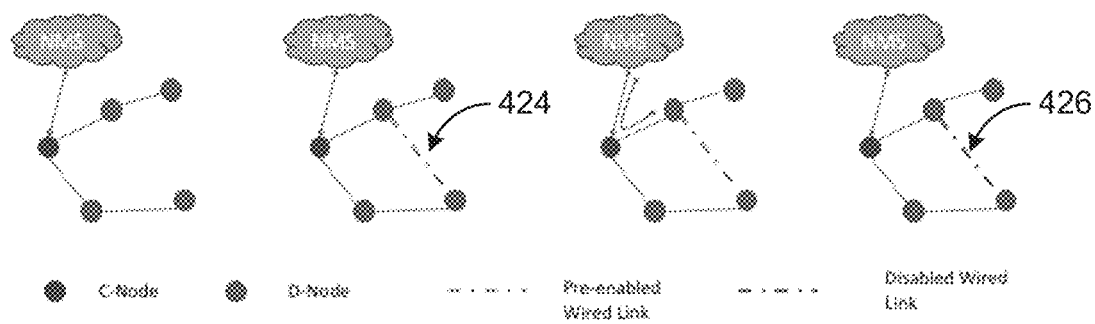

FIGS. 4A-4C illustrate various processes of adding pre-enabled communication links to a mesh network, according to an embodiment. In FIG. 4A a new node 402 is added to an existing mesh network. New node 402 is connected via a new wireless link 404. In one embodiment, the new wireless link 404 is in a pre-enabled state. When a connected link is pre-enabled it becomes part of the mesh network right away upon being added or connected and is configured to carry network traffic before any check for presence of network loops is performed. When the new link is added, the nodes to which it is connected send network event messages to NMS 127 indicating the connection and network loop detection engine 140 validates that the network is continuous and that no network loops are formed. If network loop detection engine 140 does detect a loop, corrective action can be taken to disconnect the loop, as explained below. In FIG. 4A, since no loop is formed by the addition of new wireless link 404, the link remains enabled 406 and part of the mesh network.

In FIG. 4B a new pre-enabled wireless link 414 is added between two existing nodes of the mesh network. In this embodiment, the new wireless link 414 forms a loop. Network loop detection engine 140 may detect the presence of this loop but determines that no wired links are part of the loop. As such, the link remains enabled 416 and part of the mesh network.

In FIG. 4C a new pre-enabled wired link 424 is added between two existing nodes of the mesh network. In this embodiment, the new wired link 424 forms a loop. Network loop detection engine 140 may detect the presence of this loop and determine that new wired link 424 is part of the loop. As such, network loop detection engine 140 may take corrective action to disconnect the loop, such as disabling the wired link 426.

As an alternative to being pre-enabled, a new communication link may be in a post-enabled state. When a connected link is post-enabled it does not immediately become part of the mesh and is not initially configured to carry network traffic. The post-enabled link does not transfer any data packets except for control packets used in the connection procedure. When the new link is added, the nodes to which it is connected send network event messages to NMS 127 indicating the connection and network loop detection engine 140 validates that the network is continuous and that no network loops are formed. If network loop detection engine 140 does detect a loop, corrective action can be taken to disconnect the loop, as explained below. If no loop is formed, NMS 127 can enable the link, thereby allowing the flow of network traffic across the new link. In one embodiment, enabling the link may include setting metadata flag in the corresponding network graph to indicate that the link is active and can be used to rout network traffic.

Pre-enabling a communication link may be a preferable approach, as links become operational right away and the mesh network datapath is established quickly. This is particularly relevant in the case where multiple mesh network nodes reboot and multiple links are formed simultaneously. In this case, pre-enabling of the links minimizes service disruption, especially when the network connection topology doesn't change often.

In case of post-enabling of a link, a newly established link becomes operational only after NMS checks for loops. Regardless of any delay in the transfer of critical events from the mesh network to NMS and for the execution of remote commands, no temporary loops get formed. However, the latency of communication between the mesh network and NMS directly influences the response times of the link state transitions and may introduce delay in establishing a mesh network datapath. Such delays may be detrimental when multiple mesh network nodes reboot simultaneously (e.g., because of power outage).

Figure 5:
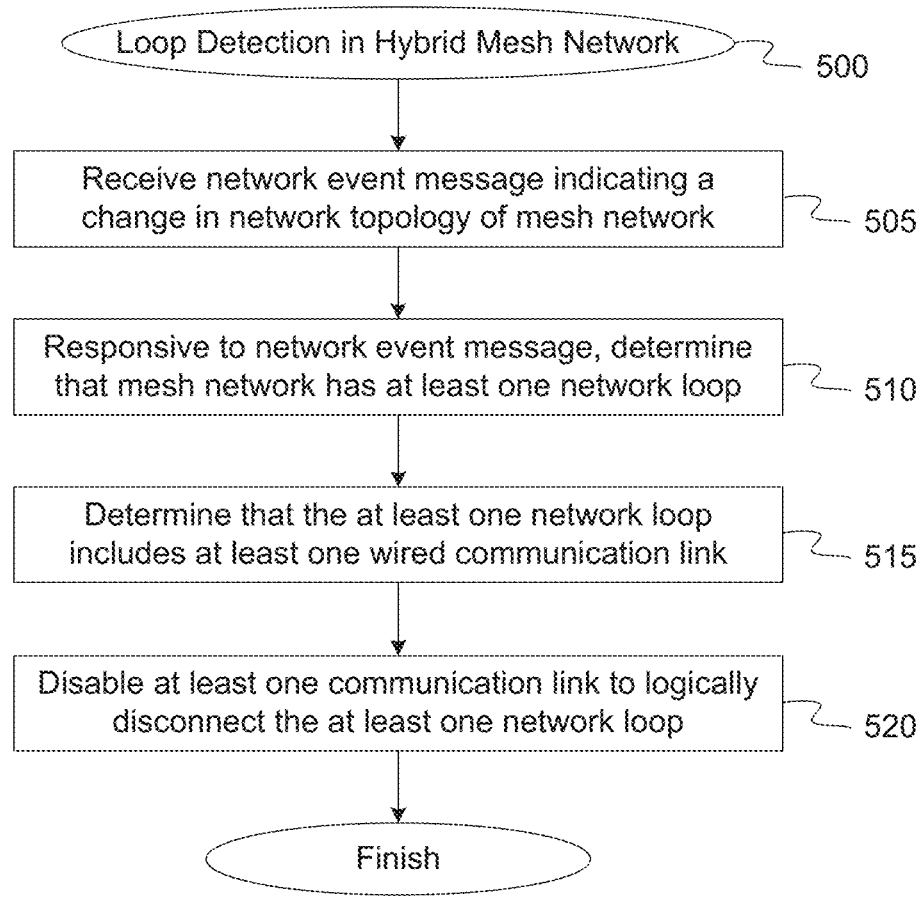
FIG. 5 is a flow diagram illustrating method of network loop detection in a mesh network, according to an embodiment.

FIG. 5 is a flow diagram illustrating method of network loop detection in a mesh network, according to an embodiment. The method 500 may be performed by processing logic that comprises hardware (e.g., circuitry, dedicated logic, programmable logic, microcode, etc.), software, firmware, or a combination thereof. The processing logic is configured to detect and remedy any network loops found in a hybrid mesh network including both wired and wireless communication links. In one embodiment, method 500 may be performed by mesh network management service 127 and/or network loop detection engine 140, as shown in FIG. 1.

Referring to FIG. 5, at block 505, method 500 receives a network event message indicating a change in a network topology of a mesh network 100. In one embodiment, NMS 127 receives the network event message from at least one of the nodes in the mesh network 100. For example, the message may be received from one of mesh nodes 104, 106, 108, and 110, or from mini-POP device 102. In one embodiment, the network event message comprises an indication of at least one of a connection of a new communication link between nodes of the mesh network 100 or a disconnection of an existing communication link between nodes of the mesh network 100. In another embodiment, the network event message indicates that at least one of a new communication link between nodes of the mesh network 100 is enabled or an existing communication link between nodes of the mesh network is disabled 100.

At block 510, responsive to the network event message, method 500 determines that the mesh network includes at least one network loop comprising a plurality of communication links connecting two nodes of the mesh network. A loop can occur in the mesh network when there is more than one signal path between two endpoints or nodes (e.g. multiple connections between two nodes or two ports on the same node connected to each other). The loop creates broadcast storms as broadcasts and multicasts are forwarded by nodes out every port, the nodes will repeatedly rebroadcast the broadcast messages flooding the network. In one embodiment, network loop detection engine 140 runs a loop detection algorithm to find out if there are any loops in the mesh network whenever a new link is connected. A network with $|V|$ vertices can potentially have $O(|V|^2)$ edges. However, network loop detection engine 140 can find the loops very quickly by using optimized algorithms and secondly by focusing only on the loops that contain wired communication links and completely ignoring loops that contain only wireless communication links. This is achieved by starting at a node with a wired communication link (e.g., Ethernet) and running an algorithm, such as Tarjan's loop detection algorithm, which has complexity of $O(|\Sigma|+|V|)$, where $|E|$ denotes a number of edges and $|V|$ denotes a number of vertices. The output of the algorithm will indicate the presence of any loops in the mesh network 100 and indicate which communication links and mesh nodes are part of the loop.

At block 515, method 500 determines that the at least one network loop includes at least one wired communication link. In one embodiment, network loop detection engine 140 uses a modified Tarjan's loop detection algorithm with certain mesh network specific considerations. Metadata contained within a network graph of the mesh network 100 will indicate various items of information including a link type field for each communication link in the graph. For example, the link type field may indicate whether a corresponding link is a wireless communication link or a wired communication link. As such, network loop detection engine 140 can read this metadata for the communication links identified as being part of the network loop and determined whether those links are wired or not. In one embodiment, network loop detection engine 140 can ignore all the loops that contain only wireless links, since the 802.11s routing protocol already accounts for such loops while routing packets. Thus, the loop detection algorithm need only be run only when there are wired links in the graph. When wired links are present, the loop detection algorithm may start at one node to which the wired link is connected as the root node of the algorithm, check for a loop that contains the other node to which that link is connected, and repeat the above procedure for all the wired links until a loop is formed.

At block 520, method 500 disables at least one of the plurality of communication links to disconnect the at least one network loop. In one embodiment, network loop detection engine 140 identifies at least one of a new communication link, the at least one wired communication link, or some other wireless communication link in the mesh network to disable or disconnect. Once identified, network loop detection engine 140 generates a network event command to cause a node in the mesh network 100 to disable or disconnect the identified link and sends the network event command to the node. Disabling a wired or wireless communication link may prevent the transmission of data packets across that link, however the link may still be active but in an idle state. This may be similar to having a persistent connection with data exchange being disabled but the link still present. Disconnecting a wired communication link for example, may include a severance of the communication link such that no data exchange is possible as the wireless link is then nonexistent. A person skilled in the art will appreciate the difference between "disabling" and "disconnecting" a wireless link as explained above. As a result, depending on the embodiment, the network loop may remain connected/active, but may be disabled such that the flow of data packets across the identified communication link is stopped.

Figure 6:
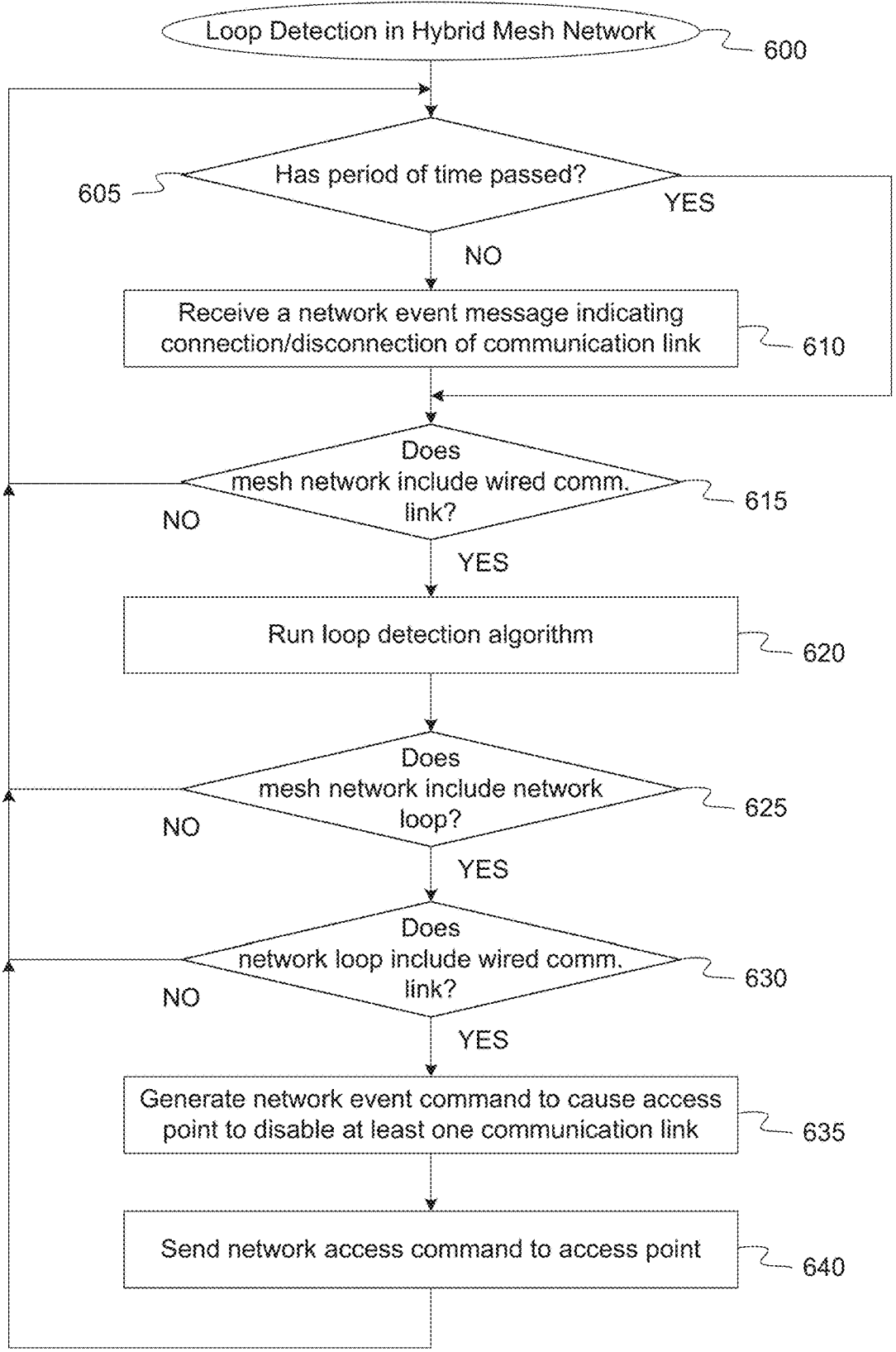
FIG. 6 is a flow diagram illustrating method of network loop detection in a mesh network, according to an embodiment.

FIG. 6 is a flow diagram illustrating method of network loop detection in a mesh network, according to an embodiment. The method 600 may be performed by processing logic that comprises hardware (e.g., circuitry, dedicated logic, programmable logic, microcode, etc.), software, firmware, or a combination thereof. The processing logic is configured to detect and remedy any network loops found in a hybrid mesh network including both wired and wireless communication links. In one embodiment, method 600 may be performed by mesh network management service 127 and/or network loop detection engine 140, as shown in FIG. 1.

Referring to FIG. 6, at block 605, method 600 determines whether a set period of time has elapsed since a previous check for network loops in the mesh network has been performed. In one embodiment, network loop detection engine 140 may include a timer that tracks how much time has passed between checks for network loops. In one embodiment, the timer may count down from a period of time (e.g., 1 hour, 12 hours, 24 hours) and upon expiration of the period of time, a check for network loops may be triggered. When a check is performed, network loop detection engine 140 may reset the timer to begin counting down again.

If the set period of time has not elapsed, at block 610, method 600 receives, from a first access point of a plurality of access points in the mesh network 100, a network event message indicating at least one of a connection of a new communication link between the first access point and a second access point of the plurality of access points or a disconnection of an existing communication link between the first access point and the second access point. The network event message may further indicate the enablement or disablement of a communication link or any other change in network topology of mesh network 100.

If the set period of time has elapsed, or in response to receiving the network event message, at block 615, method 600 determines whether the mesh network includes at least one wired communication link between two of the plurality of access points, the plurality of communication links comprising a plurality of wireless communication links and the at least one wired communication link. In one embodiment, network loop detection engine 140 can read the metadata associated with a network graph to determine whether any wired communication links are present in mesh network 100. For example, the network graph may have a metadata field for each link indicating whether the link is a wired or wireless communication link. If no wired communication links are present in the mesh network 100 network loop detection engine 140 can ignore all the loops that contain only wireless links, since the 802.11s routing protocol already accounts for such loops while routing packets.

If the mesh network includes at least one wired communication link, at block 620, method 600 executes a loop detection algorithm. In one embodiment, network loop detection engine 140 utilizes Tarjan's algorithm. In other embodiments, some other loop detection algorithm may be used. At block 625, method 600 determines whether the mesh network 100 includes at least one network loop comprising more than one signal path between two of the plurality of access points. In one embodiment, the network loop is formed from a subset of the plurality of communication links in the mesh network 100, and may include wireless and/or wired communication links.

If the mesh network includes at least one network loop, at block 630, method 600 determines whether the subset of the plurality of communication links forming the at least one network loop includes the at least one wired communication link. Metadata contained within the network graph of the mesh network 100 will indicate various items of information including a link type field for each communication link in the graph. Network loop detection engine 140 can read this metadata for the communication links identified as being part of the network loop and determined whether those links are wired communication links or wireless communication links.

If the network loop includes the at least one wired communication link, at block 635, method 600 generates a network event command. In one embodiment, the network event command causes one of the plurality of access points in the mesh network 100 to disable at least one communication link to disconnect the at least one network loop. The disabled communication link may include, for example, a newly added communication link, the at least one wired communication link, or some other wireless communication link the mesh network 100. At block 640, method 600 sends the network event command to the one of the plurality of access points.

If at any of blocks 615, 625 or 630, method 600 determines that the mesh network does not include at least one wired communication link, the mesh network does not include at least one network loop, or the network loop does not include the at least one wired communication link, respectively, no action is taken and method 600 returns to block 605.

Figure 7:
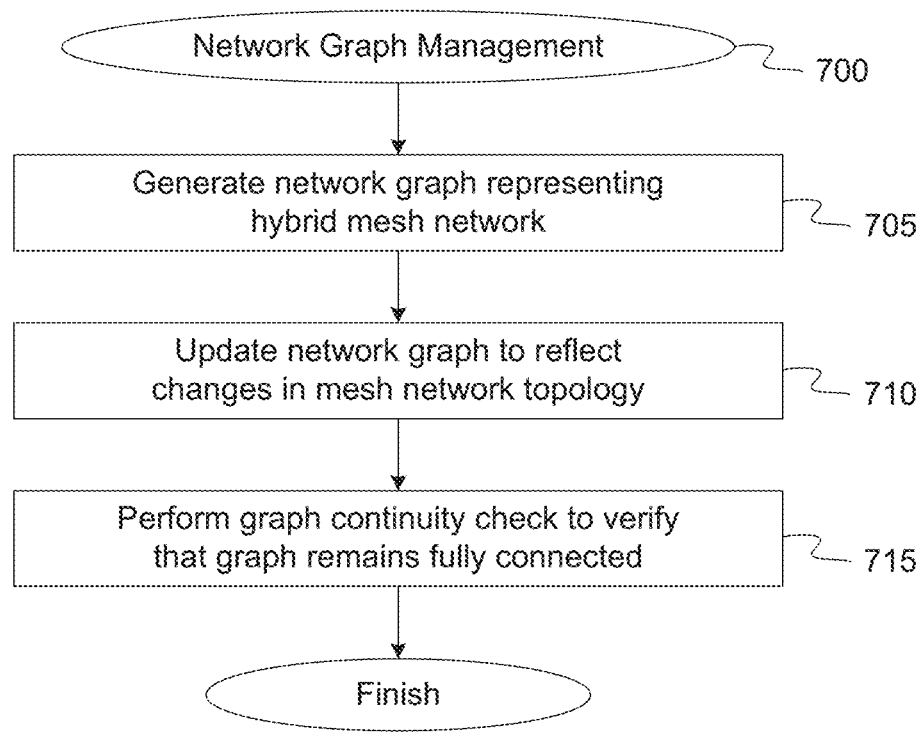
FIG. 7 is a flow diagram illustrating a method of network graph management for a hybrid mesh network, according to an embodiment.

FIG. 7 is a flow diagram illustrating a method of network graph management for a hybrid mesh network, according to an embodiment. The method 700 may be performed by processing logic that comprises hardware (e.g., circuitry, dedicated logic, programmable logic, microcode, etc.), software, firmware, or a combination thereof. The processing logic is configured to detect and remedy any network loops found in a hybrid mesh network including both wired and wireless communication links. In one embodiment, method 700 may be performed by mesh network management service 127 and/or network loop detection engine 140, as shown in FIG. 1.

Referring to FIG. 7, at block 705, method 700 generates a network graph representing hybrid mesh network 100. In one embodiment, the network graph includes a collection of vertices, V={$V_1$, $V_2$, $V_3$ . . . } where each vertex $V_i$ represents a node in the mesh network 100, such as one of network hardware devices 102, 104, 106, 108, and 110. The network graph further includes a collection of edges, E={$E_1$, $E_2$, $E_3$ . . . } where each edge $E_i$ represents a communication link between two vertices in V. Each edge $E_i$ corresponds to a tuple of vertices ($V_a$, $V_b$) from V, where the communication link represented by $E_i$ is connected between the nodes represented by vertices $V_a$ and $V_b$.

In one embodiment, each vertex and each edge has some associated parameters stored as metadata. An example of those associated parameters is shown below.

Vertex=
{
Node name, // human readable name of the node
Node type, // Type of the node (mesh node, mini-POP, mesh node with cellular link)
DSN, // Identifying serial number
Mesh ID // Identifier of the mesh
}
Edge=
{
Vertex1, // primary node in the link
Vertex2, // joining node in the link
Edge Type, // type of the link (wireless/wired)
Edge State // state of the link
(connected/disconnected/enabled/disabled)
}

In one embodiment, NMS 127 obtains the information about the vertices and edges through event notifications and other interactions with the nodes of mesh network 100. Events, such as link establishment and failure are sent to NMS 127 and NMS 127 uses this information to generate the network graph and to maintain the graph of nodes and the enabled/disabled links along with the link types (e.g., wireless vs. wired).

At block 710, method 700 updates the network graph to reflect changes in the mesh network topology. Whenever a new wired or wireless link is established in a pre-enabled state, NMS 127 adds an edge representing that link in its graph and runs two algorithms to check for loops formation and connectedness. NMS 127 actively disables and/or disconnects any links such that redundancy is maintained and loops are not formed.

At block 715, method 700 performs a graph continuity check to verify that the network graph remains fully connected. As described above, NMS 127 and network loop detection engine 140 may determine which links to disable in order to disconnect a network loop contained a wired communication link in mesh network 100. In one embodiment, NMS 127 may consider graph continuity when making this decision. Graph continuity ensures that a signal path exists between any two nodes in the mesh network. This signal path may include one or more communication links between the two nodes as well as potentially one or more intervening nodes in the signal path. A lack of graph continuity would mean that at least one node in the mesh network is disconnected from the other nodes in the mesh network. For example, NMS 127 determines whether disabling a particular communication link will interrupt a graph continuity of the mesh network 100 and cause at least mesh node of the plurality of mesh nodes in the mesh network 100 to be disconnected. In one embodiment, NMS 127 runs a graph continuity check algorithm to determine if the graph is connected. This is achieved by running a depth-first search (DFS) or breadth-first search (BFS) algorithm and by counting the number of nodes. This algorithm again has O(|V|) complexity. If NMS 127 detects disconnected graph, it creates an alert for performing a remediation action. Checking for a disconnected graph (i.e., a lack of graph continuity) ensures that the mesh network remains in operation as a whole and prevents removal of any communication link that would crash the network or otherwise interrupt communications between mesh nodes. One advantage of these algorithms is that NMS 127 gets complete insight into network topology and the loop formations and there is no throughput cost involved, such as that in the STP approach.

Figure 8:
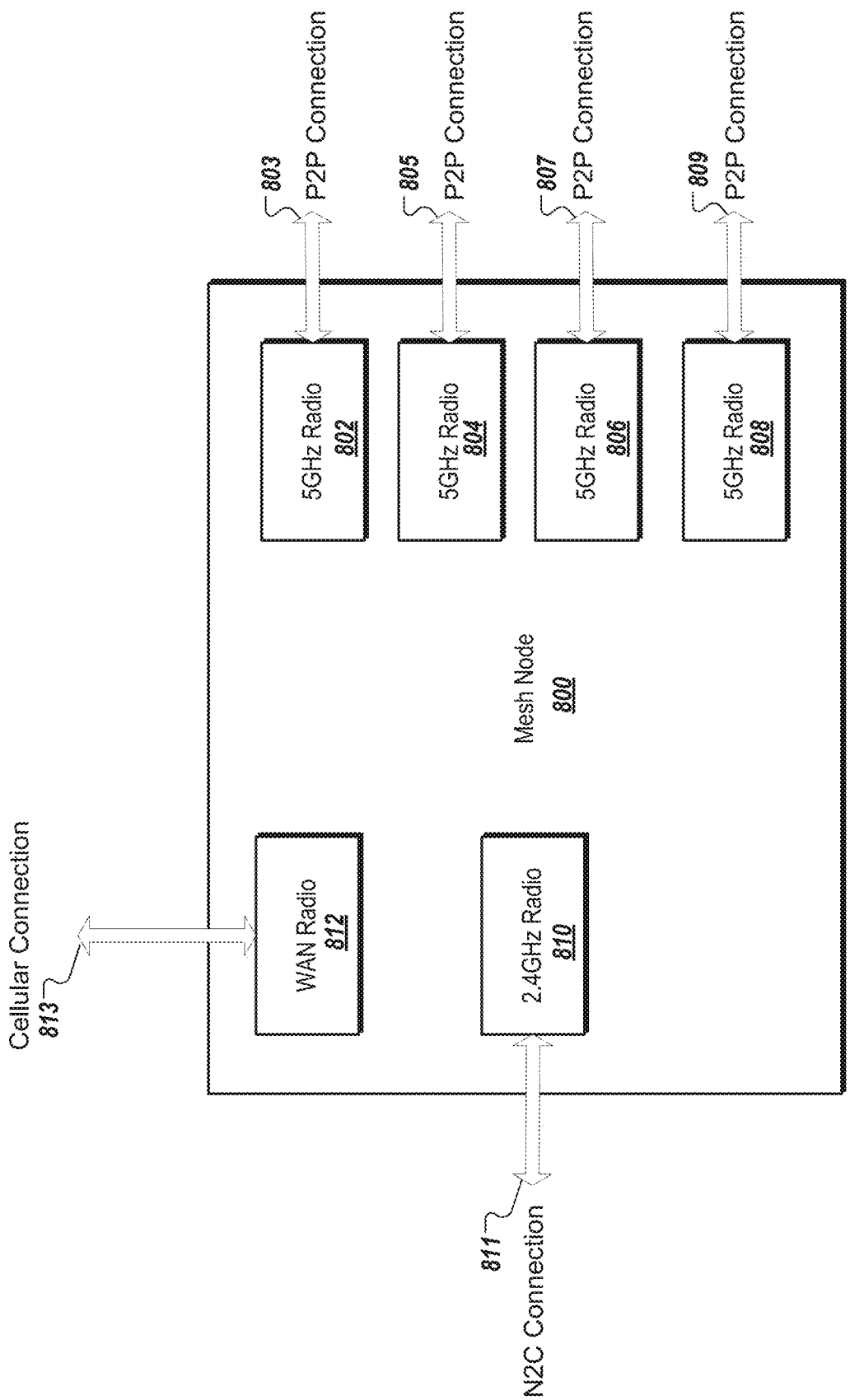
FIG. 8 is a block diagram of a mesh node with multiple radios according to one embodiment.

FIG. 8 is a block diagram of a mesh node 800 with multiple radios according to one embodiment. The mesh node 800 includes a first 5 GHz radio 802, a second 5 GHz radio 804, a third 5 GHz radio 806, a fourth 5 GHz radio 808, a 2.4 GHz radio 810, and a cellular radio 812. The first 5 GHz radio 802 creates a first P2P wireless connection 803 between the mesh node 800 and another mesh node (not illustrated) in a mesh network. The second 5 GHz radio 804 creates a second P2P wireless connection 805 between the mesh node 800 and another mesh node (not illustrated) in the mesh network. The third 5 GHz radio 806 creates a third P2P wireless connection 807 between the mesh node 800 and another mesh node (not illustrated) in the mesh network. The fourth 5 GHz radio 808 creates a fourth P2P wireless connection 809 between the mesh node 800 and another mesh node (not illustrated) in the mesh network. The 2.4 GHz radio 810 creates a N2C wireless connection 811 between the mesh node 800 and a client consumption device (not illustrated) in the mesh network. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of 100×100 network hardware devices deployed in the mesh network. In some embodiments, a number of network hardware devices in the mesh network is greater than fifty. The mesh network may include hundreds, thousands, and even tens of thousands of network hardware devices.

In some embodiments, the mesh node 800 includes memory to store content files, control and command data, as well as the aggregate data described herein. The memory of the first network hardware device may be volatile memory, non-volatile memory, or a combination of both. When a content file is not stored in the memory or the storage of the mesh node 800, the mesh node 800 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

Figure 9:
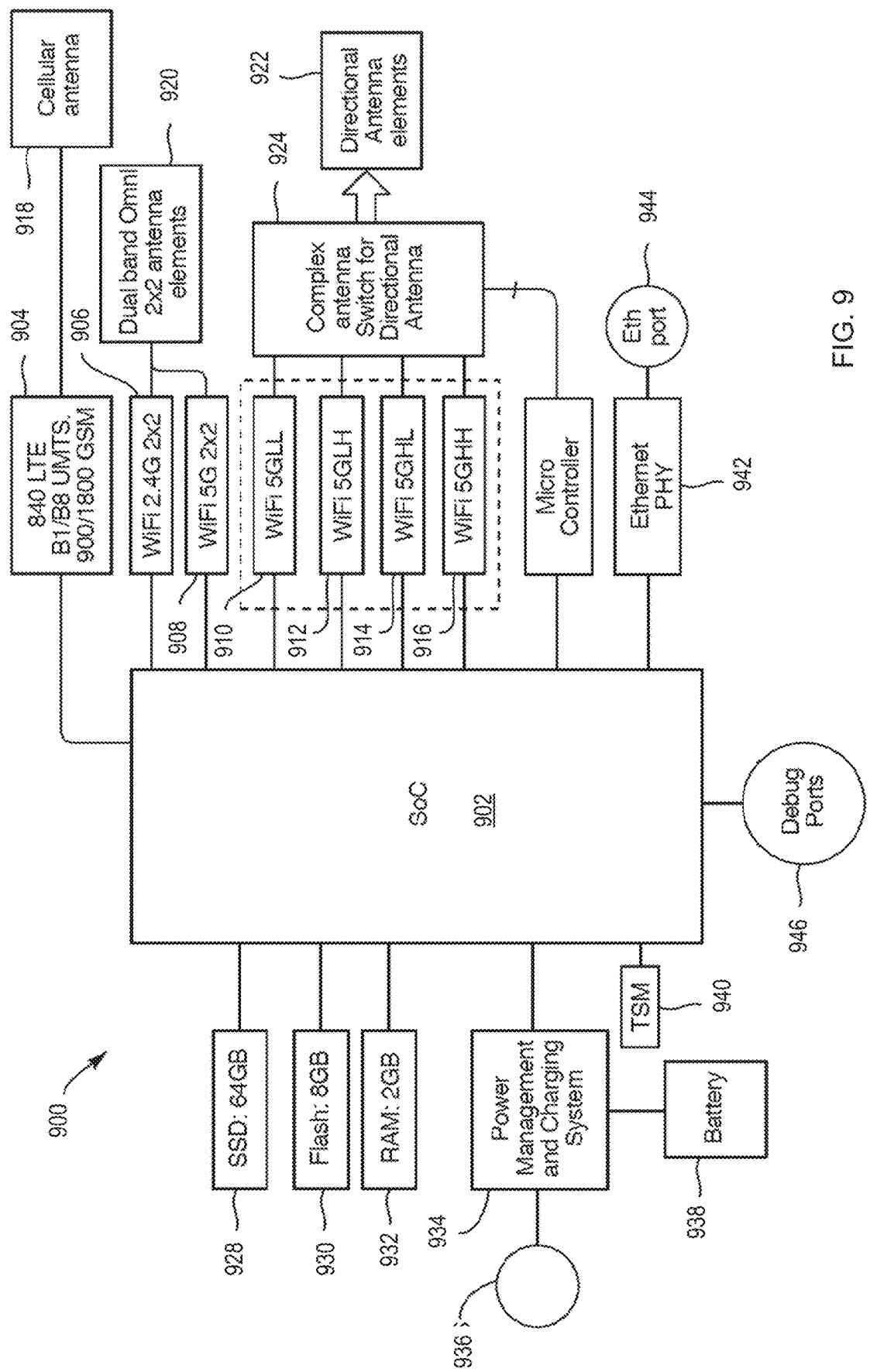
FIG. 9 is a block diagram of a mesh network device according to one embodiment.

FIG. 9 is a block diagram of a mesh network device 900 according to one embodiment. The mesh network device 900 may be one of many mesh network devices organized in a mesh network (e.g., mesh network 100). The mesh network device 900 is one of the nodes in a mesh topology in which the mesh network device 900 cooperates with other mesh network devices in distribution of content files to client consumption devices in an environment of limited connectivity to broadband Internet infrastructure, as described herein. The mesh network device 900 may be the mini-POP node 102 of FIG. 1. Alternatively, the mesh network device 900 may be any one of the mesh network devices 102, 104, 106, 108, and 110 of FIG. 1. In another embodiment, the mesh network device 900 is any one of the network hardware devices 210-230 of FIG. 2.

The mesh network device 900 includes a system on chip (SoC) 902 to process data signals in connection with communicating with other mesh network devices and client consumption devices in the mesh network. The SoC 902 includes a processing element (e.g., a processor core, a central processing unit, or multiple cores) that processes the data signals and controls the radios to communicate with other devices in the mesh network. In one embodiment, the SoC 902 is a dual core SoC, such as the ARM A15 1.5 GHz with hardware network acceleration. The SoC 902 may include memory and storage, such as 2 GB DDR RAM and 64 GB eMMC coupled to the SoC 902 via external HDD interfaces (e.g., SATA, USB3, or the like). The SoC 902 can implement processing logic comprising software, firmware, hardware, or any combination thereof. The SoC 902 may include multiple RF interfaces, such as a first interface to the first RF module 904 (e.g., HSCI interface for cellular module (3G)), a second interface to the WLAN 2.4 GHz radio 906, a third interface to the WLAN 2.4 GHz radio 908, and multiple interfaces to the WLAN 5 GHz radios, such as on a PCIe bus. In one embodiment, the SoC 902 is the IPQ8064 Qualcomm SoC or the IPQ4029 Qualcomm SoC. Alternatively, other types of SoCs may be used, such as the Annapurna SoC, or the like. Alternatively, the mesh network device 900 may include an application processor that is not necessarily considered to be a SoC.

The mesh network device 900 may also include memory and storage. For example, the mesh network device 900 may include SSD 64 GB 928, 8 GB Flash 930, and 2 GB 932. The memory and storage may be coupled to the SoC 902 via one or more interfaces, such as USB 3.0, SATA, or SD interfaces. The mesh network device 900 may also include a single Ethernet port 944 that is an ingress port for Internet Protocol (IP) connection. The Ethernet port 944 is connected to the Ethernet PHY 942, which is connected to the SoC 902. The Ethernet port 944 can be used to service the mesh network device 900. Although the Ethernet port 944 could provide wired connections to client consumption devices, the primary purpose of the Ethernet port 944 is not to connect to client consumption devices, since the 2.4 GHz connections are used to connect to client consumption devices in the mesh network. The mesh network device 900 may also include one or more debug ports 946, which are coupled to the SoC 902. The memory and storage may be used to cache content, as well as store software, firmware or other data for the mesh network device 900.

The mesh network device 900 may also include a power curation and charging system 934. The power management and charging system 934 can be connected to a power supply 936 (e.g., 240V outlet, 120V outlet, or the like). The power management and charging system 934 can also connect to a battery 938. The battery 938 can provide power in the event of power loss. The power management and charging system 934 can be configured to send a SoS message on power outage and backup system state. For example, the WLAN radios can be powered down, but the cellular radio can be powered by the battery 938 to send the SoS message. The battery 938 can provide limited operations by the mesh network device 900, such as for 10 minutes before the entire system is completely powered down. In some cases, power outage will likely affect a geographic area in which the mesh network device 900 is deployed (e.g., power outage that is a neighborhood wide phenomenon). The best option may be to power down the mesh network device 900 and let the cloud service (e.g., back end service) know of the outage in the mesh network. The power management and charging system 934 may provide a 15V power supply up to 21 watts to the SoC 902. Alternatively, the mesh network device 900 may include more or less components to operate the multiple antennas as described herein.

The mesh network device 900 includes a first radio frequency (RF) module 904 coupled between the SoC 902 and a cellular antenna 918. The first RF module 904 supports cellular connectivity using the cellular antenna 918. In one embodiment, the cellular antenna 918 includes a primary wide area network (WAN) antenna element and a secondary WAN antenna element. The first RF module 904 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, metadata download, or the like. Alternatively, the first RF module 904 may support other bands, as well as other cellular technologies. The mesh network device 900 may include a GPS antenna and corresponding GPS module to track the location of the mesh network device 900, such as moves between homes. However, the mesh network device 900 is intended to be located inside a structure, the GPS antenna and module may not be used in some embodiments.

The mesh network device 900 includes a first set of wireless local area network (WLAN) modules 906, 908 coupled between the SoC 902 and dual-band omnidirectional antennas 920. A first WLAN module 906 may support WLAN connectivity in a first frequency range using one of the dual-band omnidirectional antennas 920. A second WLAN module 908 may support WLAN connectivity in a second frequency range using one of the dual-band omnidirectional antennas 920. The dual-band omnidirectional antennas 920 may be two omnidirectional antennas for 2.4 GHz. The directional antennas 922 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 920 and the directional antennas 922 can be implemented within a fully switchable antenna architecture controlled by micro controller 926. For example, each 5 GHz radio can choose any 2 sectors (for 2 2x2 MU-MIMO streams).

The mesh network device 900 includes a second set of WLAN modules 910-916 coupled between the SoC 902 and antenna switching circuitry 924. The second set of WLAN modules 910-916 support WLAN connectivity in the second frequency range using a set of directional antennas 922. The second set of WLAN modules 910-916 is operable to communicate with the other mesh network devices of the mesh network. The antenna switching circuitry 924 is coupled to a micro controller 926. The micro controller 926 controls the antenna switching circuitry 924 to select different combinations of antennas for wireless communications between the mesh network device 900 and the other mesh network devices, the client consumption devices, or both. For example, the micro controller 926 can select different combinations of the set of directional antennas 922.

In another embodiment, a filter switch bank is coupled between the antenna switching circuitry 924 and the second set of WLAN modules 910-916. In another embodiment, the filter switch bank can be implemented within the antenna switching circuitry 924.

In the depicted embodiment, the first set of WLAN modules include a first a first 2x2 2.4 GHz MIMO radio 906 and a 2x2 5 GHz MIMO radio 908. The second set of WLAN modules includes a first 2x2 5 GHz MIMO radio 910 ("5GLL"), a second 2x2 5 GHz MIMO radio 912 ("5GLH"), a third 2x2 5 GHz MIMO radio 914 ("5GHL"), and a fourth 2x2 5 GHz MIMO radio 916 ("5GHH"). The dual-band omnidirectional antennas 920 may include a first omnidirectional antenna and a second omnidirectional antenna (not individually illustrated in FIG. 9). The set of directional antennas 922 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 900 can handle antenna switching in a static manner. The SoC 902 can perform sounding operations with the WLAN radios to determine a switch configuration. Switching is not done on a per packet basis or at a packet level. The static switch configuration can be evaluated a few times a day by the SoC 902. The SoC 902 can include the intelligence for switching decision based on neighbor sounding operations done by the SoC 902. The micro controller 926 can be used to program the antenna switching circuitry 924 (e.g., switch matrix) since the mesh network device 900 may be based on CSMA-CA, not TDMA. Deciding where the data will be coming into the mesh network device 900 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 900 can adapt a beam patter to be essentially fixed since the mesh network devices are not intended to move once situated.

In one embodiment, the antenna switching circuitry 924 includes multiple diplexers and switches to connect different combinations of antennas to the multiple radios. One configuration for the antenna switching circuitry 924 is a switch matrix architecture. In this architecture, there are six 2x2 WLAN radios (also referred to as the Wi-Fi® radios). Five radios are 5 GHz band and one radio is a 2.4 GHz radio. A switch matrix is implemented to allow the connection of each and any of the four 2x2 radios to any of the Vx/Hx MIMO antennas. Based on the switch matrix configuration and based on the routing algorithms input, each 2x2 radio can connect to a specific antenna pair in a specific direction. Each 2x2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 900.

Figure 10:
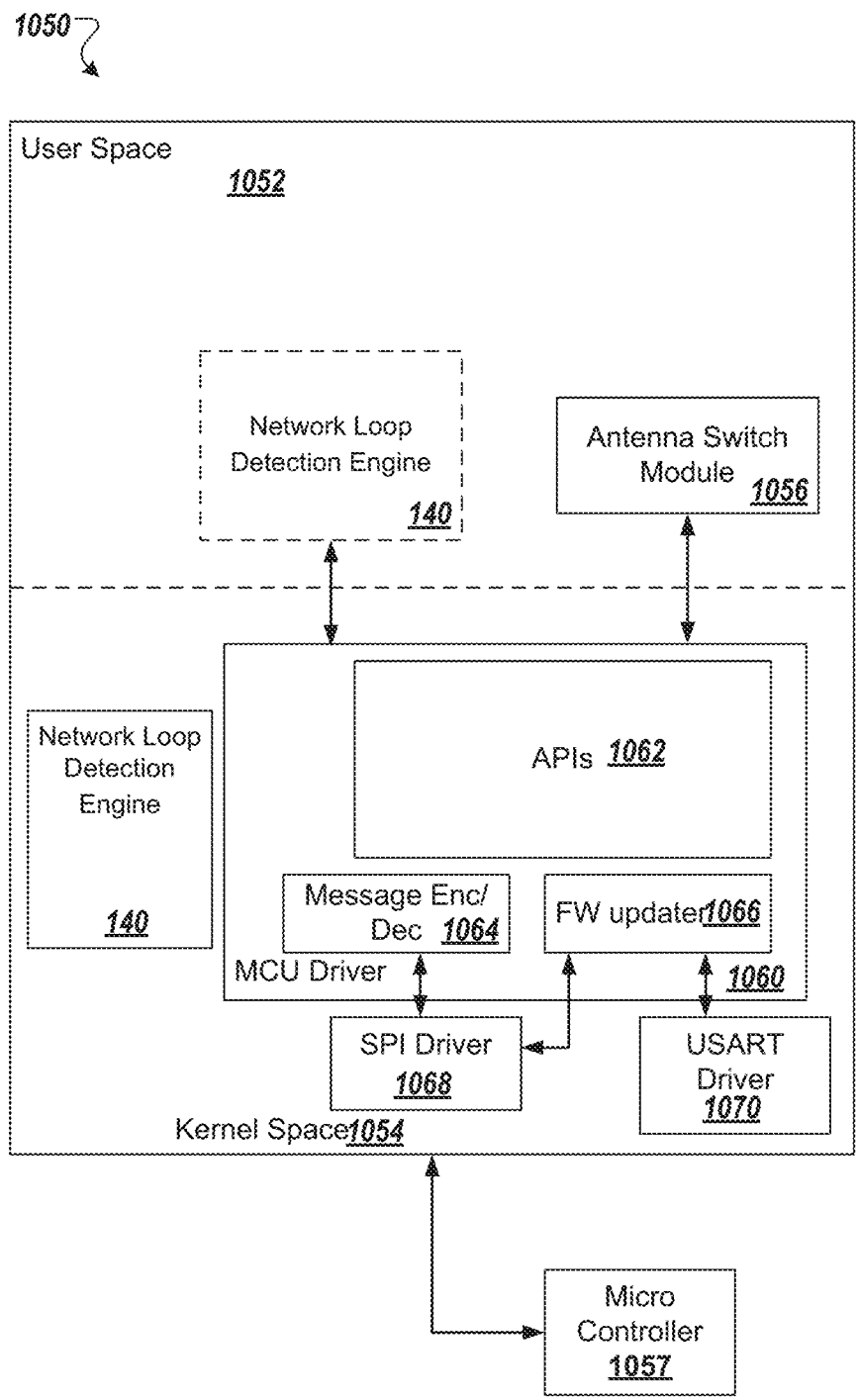
FIG. 10 is a block diagram of an application processor in which the embodiments of the present disclosure may be implemented.

FIG. 10 is a block diagram of an application processor in which the network loop detection engine 140 operates in accordance with embodiments of the present disclosure may be implemented. The application processor 1050 executes an operating system that segregates memory (virtual memory) into user space 1052 and kernel space 1054. In this embodiment, the network loop detection engine 140 runs in the user space 1052. In other embodiments, some or the entire network loop detection engine 140 can be implemented in the kernel space 1054. The network loop detection engine 140 may be instructions that when executed by the application processor 1050 perform various network loop detection operations as described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the network loop detection engine 140, the error should be reported as quickly as possible to the application. The application processor 1150 may also include modules in the user space 1152 or in the kernel space 1154 since the application processor 1150 could be operating in a battery-backed operating state during power outages.

Figure 11:
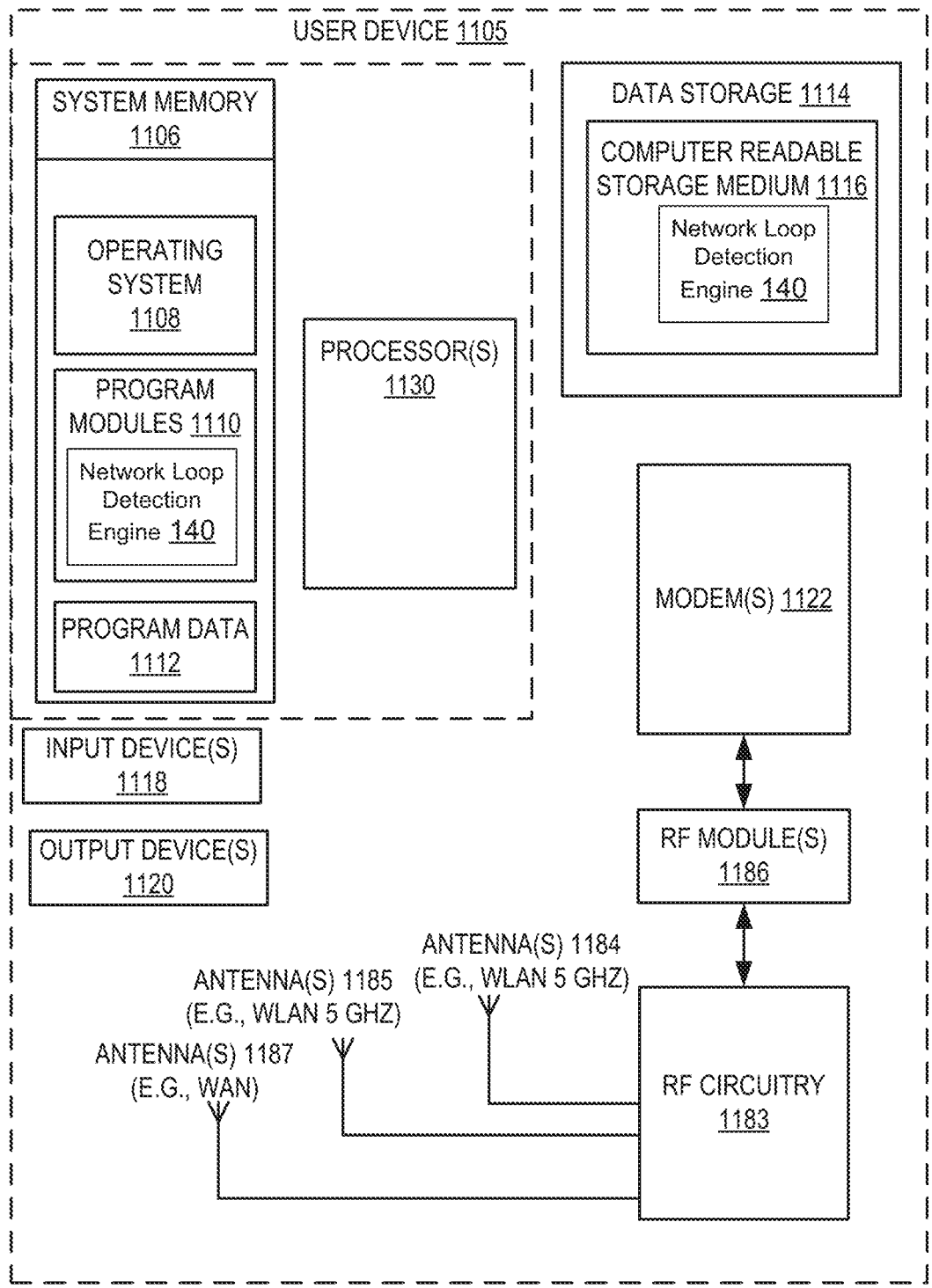
FIG. 11 is a block diagram of a network hardware device according to one embodiment.

FIG. 11 is a block diagram of a network hardware device 1100 with a network loop detection engine 140 according to one embodiment. The network hardware device 1100 may correspond to the network hardware device 102-110 of FIG. 1. In another embodiment, the network hardware device 1100 may correspond to any of the wireless mesh point stations (MP STA) 210A-210Z, mesh access points (MAP) 220A-220K, and mesh portals (MPP) 230A-220M of FIG. 2. In another embodiment, the network hardware device 1100 may correspond to the mesh node 800 of FIG. 8. In another embodiment, the network hardware device 1100 may correspond to the mesh network device 900 of FIG. 9. In another embodiment, the network hardware device 1100 may correspond to the application processor 1050 of FIG. 10. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. The program modules 1110 may include instructions of the network loop detection engine 140. In one embodiment, the system memory 1106 stores instructions of methods to control operation of the network hardware device 1100. The network hardware device 1100 performs functions by using the processor(s) 1130 to execute instructions provided by the system memory 1106.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more RF modules 1186. The RF modules 1186 may be a WLAN module, a WAN module, PAN module, GPS module, or the like. The antenna structures (antenna(s) 1184, 1185, and 1187) are coupled to the RF circuitry 1183, which is coupled to the modem 1122. The RF circuitry 1183 may include radio front-end circuitry, antenna switching circuitry, impedance matching circuitry, or the like. In one embodiment, the RF circuitry 1183 includes the RFFE circuitry with high selectivity performance as described in the various embodiments of FIGS. 5-12. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multi-media messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as descried herein. Antennas 1184, 1185, and 1187 may be configured to transmit in different frequency bands and/or using different wireless communication protocols. The antennas 1184, 1185, and 1187 may be directional, omnidirectional, or non-directional antennas. In addition to sending data, antennas 1184, 1185, and 1187 may also receive data, which is sent to appropriate RF modules connected to the antennas.

One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the mesh network and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

Figure 12:
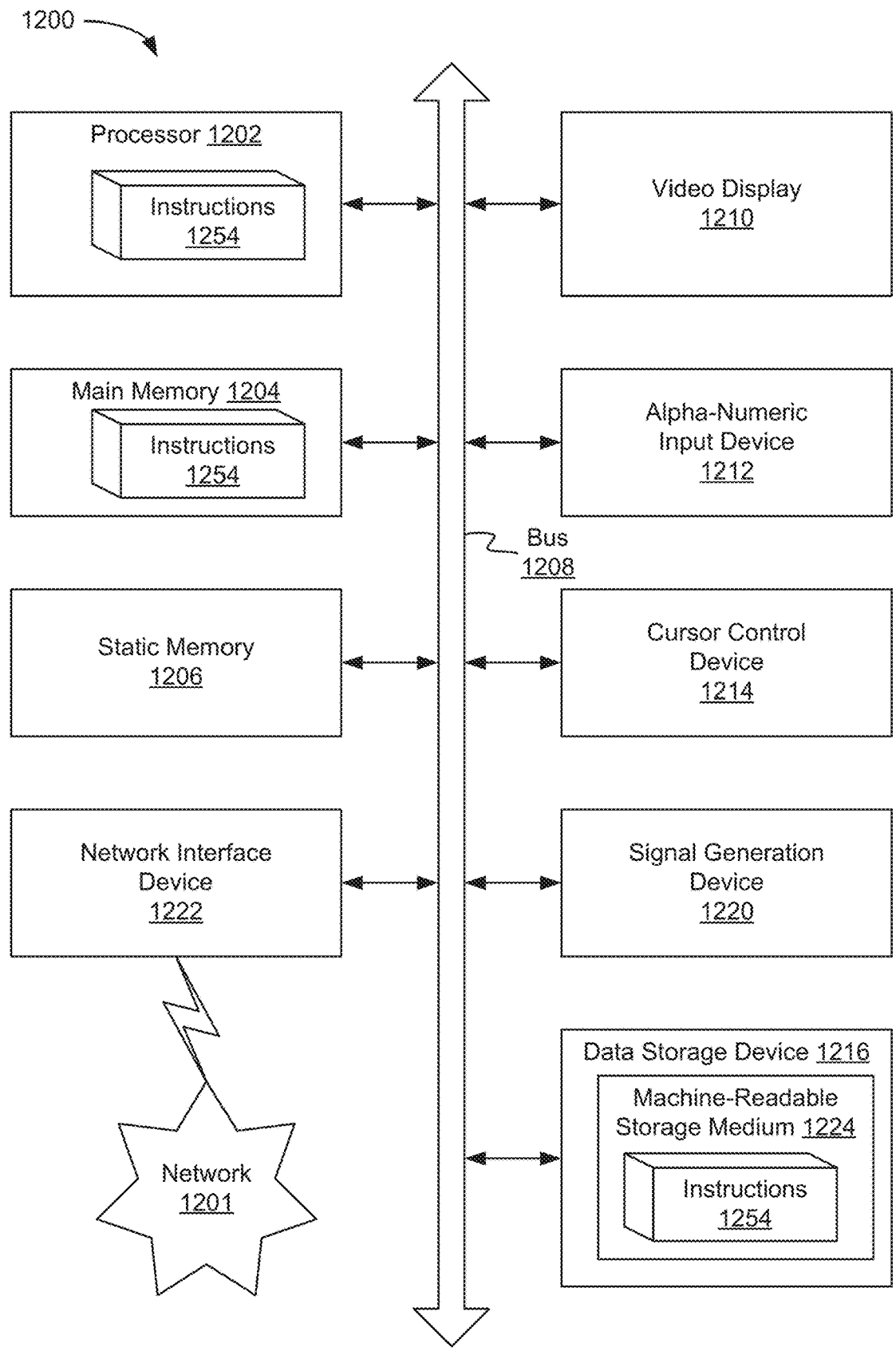
FIG. 12 illustrates a component diagram of a computer system which may implement one or more methods described herein.

FIG. 12 illustrates a component diagram of a computer system which may implement one or more methods of network loop detection as described herein. A set of instructions for causing the computer system 1200 to perform any one or more of the methods discussed herein may be executed by the computer system 1200. In one embodiment, the computer system 1200 may implement the functions of the network loop detection engine 140 of FIG. 1. Alternatively, the computer system 1200 may implement functions of the network loop detection engine 140 in a central entity.

In one embodiment, the computer system 1200 may be connected to other computer systems by a network 1201 provided by a Local Area Network (LAN), an intranet, an extranet, the Internet or any combination thereof. The computer system may operate in a collection of one or more computers to implement a cloud computing system. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1200 includes a processing device 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.) and a data storage device 1216, which communicate with each other via a bus 1208.

In one embodiment, the processing device 1202 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1202 may therefore include multiple processors. The processing device 1202 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor or the like.

In one embodiment, the computer system 1200 may further include one or more network interface devices 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker).

In one embodiment, the data storage device 1218 may include a computer-readable storage medium 1224 on which is stored one or more sets of instructions 1254 embodying any one or more of the methods or functions described herein. The instructions 1254 may also reside, completely or at least partially, within the main memory 1204 and/or within the processing device 1202 during execution thereof by the computer system 1200; the main memory 1204 and the processing device 1202 also constituting machine-readable storage media.

While the computer-readable storage medium 1224 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of network loop detection in a mesh network comprising a plurality of communication links, the method comprising:
   receiving, by a cloud computing server and from an access point in the mesh network, a network event message indicating establishment of a new communication link in the mesh network;
   determining, by the cloud computing server, that the plurality of communication links comprises a wired communication link;
   responsive to receiving the network event message indicating the establishment of the new communication link in the mesh network, executing, by the cloud computing server, a loop detection algorithm to determine that the mesh network includes at least one network loop between a first mesh node and a second mesh node of the plurality of mesh nodes, wherein the at least one network loop comprises a subset of the plurality of communication links and the new communication link, wherein the first mesh node is part of a first cluster of nodes interconnected by a first plurality of wireless communication links, wherein the second mesh node is part of a second cluster of nodes interconnected by a second plurality of wireless communication links, and wherein the first mesh node and the second mesh node are connected by the wired communication link;
   determining, by the cloud computing server, that the subset of the plurality of communication links includes the wired communication link;
   sending, by the cloud computing server, a network event command to the first mesh node; and
   causing, by the cloud computing server, the first mesh node to disable at least one of: the new communication link, the wired communication link, or a communication link in the subset of the plurality of communication links.

2. The method of claim 1, further comprising:
   determining, by the cloud computing server, that disabling the at least one of the new communication link, the wired communication link, or the communication link in the subset of the plurality of communication links will not interrupt a graph continuity of the mesh network.

3. The method of claim 1, further comprising:
   upon determining that the mesh network includes at least one network loop, determining, by the cloud computing server, that the new communication link was pre-enabled to carry network traffic; and
   causing, by the cloud computing server, the first mesh node to disable the new communication link.

4. A computing device comprising:
   one or more processors; and
   memory to store computer-executable instructions that, if executed, cause the one or more processors to:
      receive, from an access point in a mesh network, a message indicating a change in a network topology of the mesh network, the message comprising an indication of at least one of establishment of a new wired communication link or disconnection of an existing wired communication link in the mesh network, wherein the computing device is connected to the mesh network;
      responsive to receiving the message indicating the change in the network topology of the mesh network, execute a loop detection algorithm to determine that the mesh network includes a network loop comprising a plurality of communication links that connect a first mesh node and a second mesh node of the mesh network, wherein the first mesh node is part of a first cluster of nodes interconnected by a first plurality of wireless communication links, wherein the second mesh node is part of a second cluster of nodes interconnected by a second plurality of wireless communication links, and wherein the first mesh node and the second mesh node are connected by a wired communication link;
determine that the network loop includes the wired communication link; and
disable one of the plurality of communication links to disconnect the network loop.

5. The computing device of claim 4, wherein to determine that the mesh network includes a network loop, the one or more processors to determine that the plurality of communication links comprise a wireless communication link and the wired communication link.

6. The computing device of claim 4, wherein to receive the message, the one or more processors to receive an indication of enablement of a new wireless or wired communication link in the mesh network or disablement of an existing wireless or wired communication link in the mesh network.

7. The computing device of claim 6, wherein the instructions further cause the one or more processors to:
upon determining that the mesh network includes a network loop, determine that the new wireless or wired communication link was pre-enabled to carry network traffic; and
cause the first node in the mesh network to disable the new wireless or wired communication link.

8. The computing device of claim 6, wherein the instructions further cause the one or more processors to:
upon determining that the mesh network includes a network loop, determine that the new wireless or wired communication link was post-enabled and not configured to carry network traffic; and
cause the first node in the mesh network to not enable the new wireless or wired communication link.

9. The computing device of claim 6, wherein the instructions further cause the one or more processors to:
update a graph of the network topology of the mesh network to reflect the enablement of the new wireless or wired communication link or the disablement of the existing wireless or wired communication link.

10. The computing device of claim 4, wherein the first cluster of nodes are within a first threshold distance of each other, wherein the second cluster of nodes are within a second threshold distance of each other, and wherein a distance between the first cluster and the second cluster is greater than the first threshold distance or the second threshold distance.

11. The computing device of claim 4, wherein the instructions further cause the one or more processors to:
perform a graph continuity check on the graph to determine that disabling the one of the plurality of communication links will not interrupt a graph continuity of the mesh network.

12. A method comprising:
receiving, from an access point in a mesh network, a message indicating a change in a network topology of the mesh network, the message comprising an indication of at least one of establishment of a new wired communication link or disconnection of an existing wired communication link in the mesh network;
responsive to receiving the message indicating the change in the network topology of the mesh network, executing a loop detection algorithm to determine that the mesh network includes a network loop comprising a plurality of communication links that connect a first mesh node and a second mesh node of the mesh network, wherein the first mesh node is part of a first cluster of nodes interconnected by a first plurality of wireless communication links, wherein the second mesh node is part of a second cluster of nodes interconnected by a second plurality of wireless communication links, and wherein the first mesh node and the second mesh node are connected by a wired communication link;
determining that the network loop includes the wired communication link; and
disabling one of the plurality of communication links to disconnect the network loop.

13. The method of claim 12, wherein the plurality of communication links comprises a wireless communication link and the wired communication link.

14. The method of claim 12, wherein the message comprises an indication of enablement of a new wireless or wired communication link in the mesh network or disablement of an existing wireless or wired communication link in the mesh network.

15. The method of claim 14, further comprising:
updating a graph of the network topology of the mesh network to reflect the enablement of the new wireless or wired communication link or the disablement of the existing wireless or wired communication link.

16. The method of claim 15, further comprising:
performing a graph continuity check on the graph to determine that disabling the one of the plurality of communication links will not interrupt a graph continuity of the mesh network.

17. The method of claim 12, further comprising:
upon determining that the mesh network includes a network loop, determining that the new wireless or wired communication link was pre-enabled to carry network traffic; and
causing the first node in the mesh network to disable the new wireless or wired communication link.

18. The method of claim 12, further comprising:
upon determining that the mesh network includes a network loop, determining that the new wireless or wired communication link was post-enabled and not configured to carry network traffic; and
causing the first node in the mesh network to not enable the new wireless or wired communication link.

* * * * *